(12) United States Patent
Takase et al.

(10) Patent No.: US 7,096,131 B2
(45) Date of Patent: Aug. 22, 2006

(54) METHOD FOR DETERMINING SPECIFICATIONS OF FUEL CELL POWER GENERATION SYSTEM AND FUEL CELL POWER GENERATION SYSTEM

(75) Inventors: Hidehiko Takase, Wako (JP); Koji Tamenori, Wako (JP); Naohiko Oki, Wako (JP); Asao Uenodai, Wako (JP); Naoyuki Enjoji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/962,140

(22) Filed: Oct. 7, 2004

(65) Prior Publication Data

US 2005/0076075 A1    Apr. 7, 2005

(30) Foreign Application Priority Data

Oct. 7, 2003    (JP)    ............................. 2003-347837

(51) Int. Cl.
    *G01R 31/36*    (2006.01)
(52) U.S. Cl. ...................................................... 702/63

(58) Field of Classification Search .................. 702/57, 702/60, 61, 63–65; 429/12, 21; 320/127, 320/134, 136
See application file for complete search history.

(56) References Cited

U.S. PATENT DOCUMENTS

2002/0172847 A1* 11/2002 Aoyagi et al. ................ 429/24

FOREIGN PATENT DOCUMENTS

JP    2002-305011    10/2002

* cited by examiner

*Primary Examiner*—Michael Nghiem
(74) *Attorney, Agent, or Firm*—Lahive & Cockfield, LLP; Anthony A. Laurentano, Esq.

(57) ABSTRACT

The present invention provides a method for easily determining the specifications of a fuel cell and a capacitor constituting a fuel cell power generation system according to an operational mode of an electric load connected to the fuel cell power generation system and a fuel cell power generation system having its specification set using the method. The specifications of the fuel cell and the capacitor connected in parallel to the fuel cell are determined by meeting three requirements: the driving performance, the fuel economy, and the durability, in good balance.

5 Claims, 11 Drawing Sheets

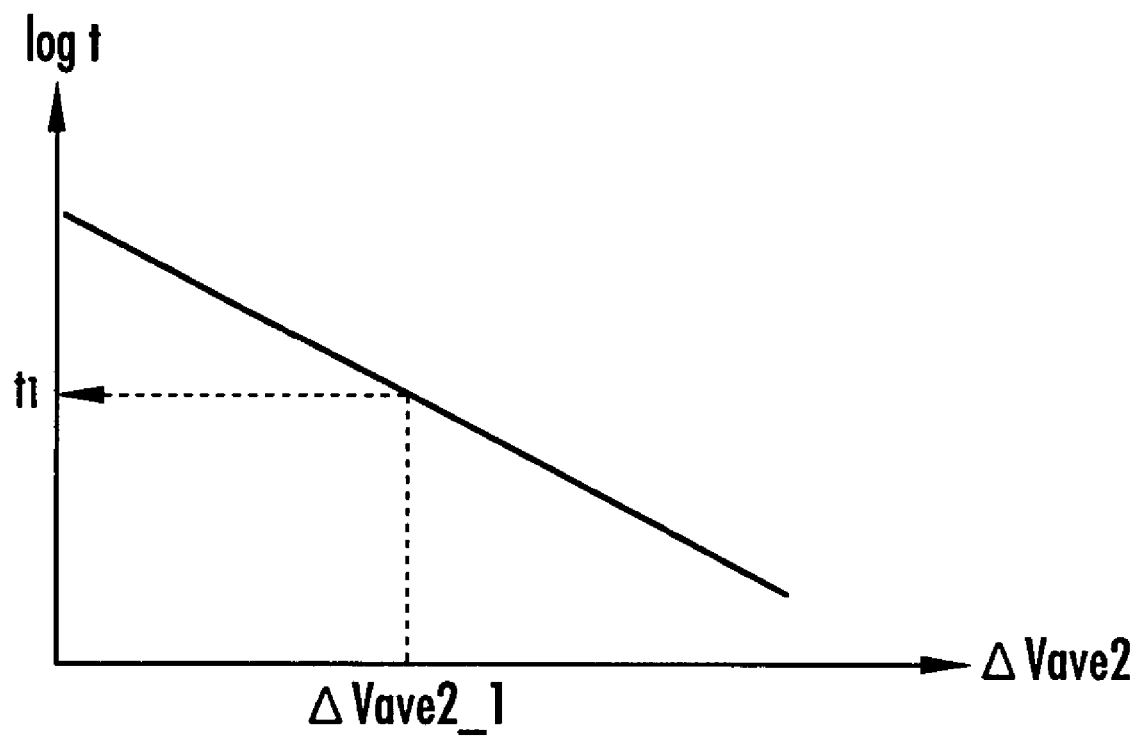

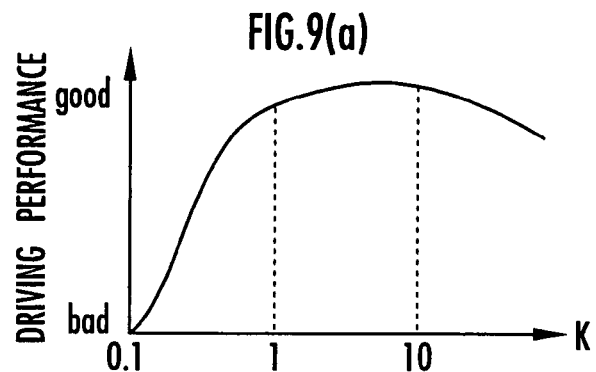
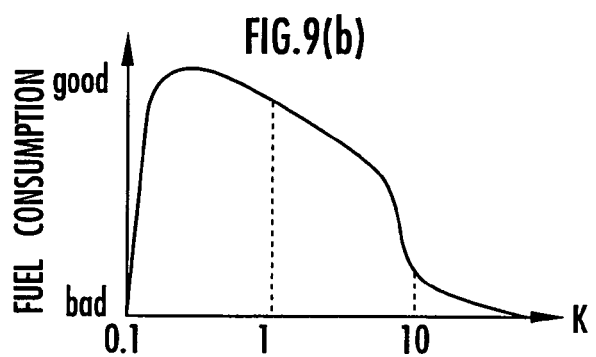
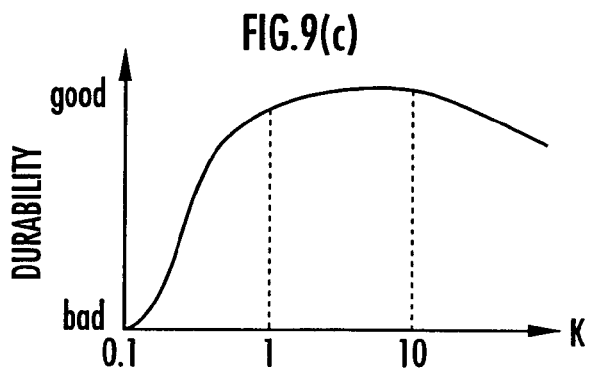
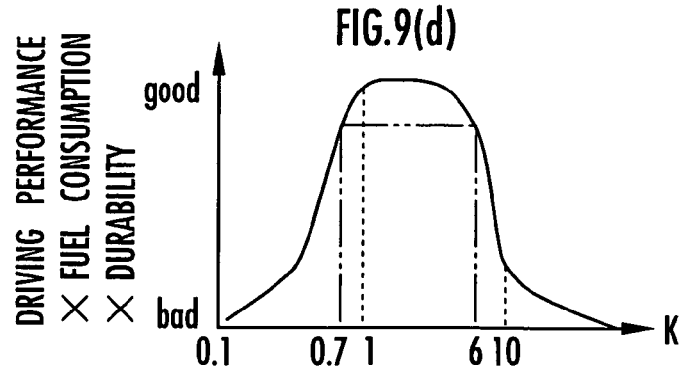

METHOD FOR DETERMINING SPECIFICATIONS OF FUEL CELL POWER GENERATION SYSTEM AND FUEL CELL POWER GENERATION SYSTEM

BACKGROUND OF THE INVENTION

1. Field of the Invention

The present invention relates to a method for determining specifications of a fuel cell power generation system constructed of a fuel cell and a capacitor, which are connected in parallel, according to an operational mode of an electric load connected to the fuel cell power generation system, and a fuel cell power generation system with its specifications set using the method.

2. Description of the Related Art

Hitherto, there has been known a hybrid fuel cell power generation system constructed of a fuel cell and a capacitor connected in parallel (refer to, for example, Japanese Unexamined Patent Application Publication No. 2002-305011). Such a fuel cell power generation system is adapted to control the amount of a reactive gas (a reducing gas, such as hydrogen, providing a fuel and/or an oxidizing gas, such as air, which is reacted with the reducing gas to take out electrons) supplied to the fuel cell on the basis of the power required by an electric load connected to the fuel cell and the capacitor.

If the power required by the electric load suddenly increases, and the fuel cell fails to generate sufficient amount of power quickly enough to catch up with the increase in the supply amount of a reactive gas, causing insufficient power supplied from the fuel cell in response to the request for the power, then the capacitor discharges current to make up for the insufficient power supply.

It is required to determine specifications of a fuel cell and a capacitor constituting a fuel cell power generation system so that they match an operational mode of an electric load connected to the fuel cell power generation system. For instance, if the fuel cell power generation system is used as a power source of an electric automobile, then it is necessary to determine the specifications of the fuel cell and the capacitor to provide driving performance, fuel economy, durability, etc. required of the electric automobile according to operational modes of electric auxiliary equipment, including an electric motor for actuating driving wheels and an air conditioner, of the electric automobile.

However, the fuel cell and the capacitor cooperatively supply power to an electric load, making it difficult to determine the specifications of the fuel cell and the capacitor in good balance to meet various requirements according to the operational modes of electric loads.

SUMMARY OF THE INVENTION

The present invention has been made with a view toward solving the problem described above and it is an object of the invention to provide a method for easily determine specifications of a fuel cell and a capacitor constituting a fuel cell power generation system according to an operational mode of an electric load connected to the fuel cell power generation system, and a fuel cell power generation system having its specifications set using the method.

To this end, according to the present invention, there is provided a method for determining, by a programmed computer, specifications of a fuel cell power generation system constructed of a fuel cell and a capacitor connected in parallel, the method including a first step for determining a limit value of an increasing rate di/dt of an output current density per unit cell area of the fuel cell according to at least an operational mode of an electric load connected to the fuel cell system, a second step for determining an internal resistance Rfc of the fuel cell on the basis of an output current-voltage (I-V) characteristic of the fuel cell based on the di/dt limit value determined by the first step, and a third step for determining an internal resistance Rcap of the capacitor such that a characteristic value K calculated by weighted multiplication of Rfc determined by the second step and Rcap lies within a predetermined range, thereby to determine specifications of the fuel cell and the capacitor.

With this arrangement, the limit value of the increasing rate di/dt of the output current density of the fuel cell is first determined according to the operational mode of an electric load to be connected to the fuel cell power generation system in the first step. If the di/dt limit value is increased, then fuel economy and durability of the fuel cell deteriorates although the limitation of supply of current to an electric load is eased and output performance of the electric load improves. On the other hand, if the di/dt limit value is decreased, then the speed of lowering an output voltage of the fuel cell when output current is increased slows down, frequently making it difficult to produce a voltage difference between the fuel cell and the capacitor. This in turn makes it difficult to produce assist effect for power supply to the electric load by current discharged from the capacitor.

Thus, the capability of supplying power to the electric load from the fuel cell power generation system changes as the di/dt limit value is changed. For this reason, it is required that the di/dt limit value be properly set according to the operational mode of an electric load.

Then, in the second step, the internal resistance Rfc of the fuel cell is calculated from the output current-voltage (I-V) characteristic of the fuel cell on the basis of the di/dt limit value determined in the first step. The I-V characteristic of the fuel cell changes when the di/dt limit value is changed, which will be discussed in detail hereinafter. The I-V characteristic of the fuel cell in standard applications is substantially linear, so that the internal resistance Rfc of the fuel cell based on the di/dt limit value can be calculated from an inclination of the I-V characteristic.

Subsequently, in the third step, the internal resistance Rcap of the capacitor is determined such that the characteristic value K calculated by the weighted multiplication of the internal resistance Rfc of the fuel cell and the Rcap lies within a predetermined range. If the ratio of Rfc to Rcap (Rfc/Rcap) is small, then less current is discharged from the capacitor when power supply assist by the discharge current of the capacitor begins. This causes the assist power from the capacitor to decrease, resulting in poor responsiveness of the electric load. As the internal resistance Rcap of the capacitor increases, the overall discharge power from the capacitor during an assist period increases. Hence, it is required to determine the internal resistance Rfc of the fuel cell and the internal resistance Rcap of the capacitor in good balance.

Therefore, the specifications of the capacitor can be easily determined by using the characteristic value K calculated by the weighted multiplication of the internal resistance Rfc of the fuel cell and the internal resistance Rcap of the capacitor as an indication of good balance between Rfc and Rcap, and then setting Rcap such that the characteristic value K lies within the predetermined range.

The predetermined coefficient K is calculated according to an expression (1) shown below:

$$K = 1/(Rcap \cdot Rfc^{1/2}) \tag{1}$$

where Rfc: Internal resistance of the fuel cell; and Rcap: Internal resistance of the capacitor.

The meaning of the above expression (1) will be explained with reference to FIG. 11. FIG. 11A is a circuit diagram showing an electric load 102 connected to a fuel cell power generation system constructed of a fuel cell 100 and a capacitor or 101 connected in parallel. FIG. 11B shows an I-V characteristic graph of the fuel cell 100, the axis of abscissas indicating current (I), while the axis of ordinates indicating voltage (V).

Referring to FIG. 11B, P_idle denotes an idle mode wherein only a current Ifc_idl for actuating electric auxiliary equipment, such as a compressor for supplying air to the fuel cell 100, is output from the fuel cell 100, while no power is being supplied to the electric load 102. P_max denotes a mode wherein a maximum output current Ifc_max is being output from the fuel cell 100. At this time, the relationship shown by an expression (2) given below applies:

$$Vfc\_max = Vfc\_idle - (Ifc\_max - Ifc\_idle) \cdot Rfc \quad (2)$$

where Vfc_max: Maximum output voltage of the fuel cell; Ifc_max: Maximum output current of the fuel cell; Vfc_idle: Idle voltage of the fuel cell; Ifc_idle: Idle current of the fuel cell; and Rfc: Internal resistance of the fuel cell.

If the output current of the fuel cell 100 momentarily increases from Ifc_idle to Ifc_max and the output voltage of the fuel cell 100 drops from Vfc_idle to Vfc_max, then the voltage across the terminals of the capacitor 101 connected in parallel to the fuel cell 100 drops from Vfc_idle to Vfc_max. In this case, an open circuit voltage Vcap_0 of the capacitor 101 is equal to the idle voltage Vfc_idle of the fuel cell 100. Hence, a release current Icap_max from the capacitor 101 can be represented by an expression (3) given below:

$$Icap\_max = (Vcap\_0 - Vfc\_max)/Rcap \quad (3)$$
$$= (Vfc\_idle - Vfc\_max)/Rcap$$

where Vcap_0: Open circuit voltage of the capacitor; and Rcap: Internal resistance of the capacitor.

In the above expression (2), if the idle current is regarded as Ifc_idle≈0, then an expression (4) shown below holds. Substituting the expression (4) into the above expression (3) provides an expression (5) shown below:

$$Vfc\_idle - Vfc\_max = Ifc\_max \cdot Rfc \quad (4)$$

$$Icap\_max = Ifc\_max \cdot Rfc/Rcap \quad (5)$$

The output voltage of the fuel cell and the voltage across the terminals of the capacitor are equal, so that the above expression (5) can be represented in terms of the power shown in an expression (6) given below:

$$Lcap\_max = Lfc\_max \cdot Rfc/Rcap \quad (6)$$

where Lcap_max: Output power of the capacitor when Icap_max is output; and Lfc_max: Output power of the fuel cell when Ifc_max is output.

If Vfc_idle−Vfc_max=ΔV, then time series changes in discharge current Icap of the capacitor are represented by an expression (7) given below:

$$Icap(t) = \Delta V/Rcap \cdot e^{-t/Tc} \quad (7)$$

where Icap(t): Time series changes in discharge current of the capacitor; and Tc: Time constant (Tc=C·Rcap, C: Capacitance of the capacitor).

Overall loss power El in the capacitor 101 is calculated according to an expression (8) given below. Hence, overall assist power Ea provided by the capacitor can be calculated according to an expression (9) shown below:

$$El = \int Icap(t)^2 \cdot Rcap\, dt \quad (8)$$
$$= Rcap \cdot \int (\Delta V/Rcap \cdot e^{-t/Tc})^2 dt$$
$$= \Delta V^2/Rcap \cdot \int e^{-2t/Tc} dt$$
$$= \Delta V^2/Rcap \cdot Tc/2$$
$$= \Delta V^2/Rcap \cdot (C \cdot Rcap)/2$$
$$= 1/2 \cdot (C \cdot \Delta V^2)$$

$$Ea = 1/2 \cdot C \cdot (Vfc\_idle^2 - Vfc\_max^2) - El \quad (9)$$
$$= 1/2 \cdot C \cdot (Vfc\_idle^2 - Vfc\_max^2) - 1/2 \cdot (C \cdot \Delta V^2)$$
$$= 1/2 \cdot C\{(Vfc\_max + \Delta V)^2 - Vfc\_max^2 - \Delta V^2\}$$
$$= C \cdot Vfc\_max \cdot \Delta V$$
$$= C \cdot Vfc \cdot Ifc\_max \cdot Rfc$$
$$= C \cdot Lfc\_max \cdot Rfc$$

By substituting the above expression (6) into the above expression (9), the overall assist power Ea can be represented by an expression (10) given below:

$$Ea = C \cdot (Lcap\_max \cdot Rcap/Rfc) \cdot Rfc \quad (10)$$
$$= C \cdot Lcap\_max \cdot Rcap$$

Based on the above expression (6), if the ratio of the internal resistance of the fuel cell and that of the capacitor (Rfc/Rcap) is small, then the output power Lcap_max of the capacitor decreases. From the above expression (10), the overall assist power increases as the internal resistance Rcap of the capacitor increases.

Increasing the ratio, Rfc/Rcap, allows the output power of the capacitor to be increased when the assist mode is begun. On the other hand, however, the output power of the fuel cell decreases as the resistance value of Rfc increases, so that a total output power of the fuel cell and the capacitor decreases in the latter half of an assist period. Hence, multiplying the above expression (6) and the above expression (10), the expression (10) being weighted, provides an expression (11) shown below:

$$Lcap\_max^{-0.5} \cdot Ea^{-1.5} = (Lfc\_max \cdot Rfc/Rcap)^{-0.5} \cdot \quad (11)$$
$$(C \cdot Lcap\_max \cdot Rcap)^{-1.5}$$
$$= Lfc\_max^{-0.5} \cdot C^{-1.5} \cdot Lcap\_max^{-1.5} \cdot Rfc^{-0.5} \cdot$$
$$Rcap^{-1}$$
$$= K1/(Rcap \cdot Rfc^{0.5})$$

where $K1 = Lfc\_max^{-0.5} \cdot C^{-1.5} \cdot Lcap\_max^{-1.5}$

The value of K calculated according to an expression (12) given below is used as a characteristic value for determining whether a combination of the internal resistance Rfc of the fuel cell and the internal resistance Rcap of the capacitor is appropriate or not, thus making it possible to easily determine, according to the above expression (11), a combination of Rfc and Rcap that places a higher priority on securing the overall assist power Ea by the capacitor 101 during the assist period than the magnitude of the assist power by the capacitor 101 at the beginning of the assist.

$$K = 1/(Rcap \cdot Rfc^{1/2}) \quad (12)$$

The fuel cell power generation system is mounted in an electric automobile, and the electric load is an electric motor mounted in the electric automobile to actuate driving wheels. In the first step, a limit value of di/dt is determined in a range defined by the following expression (13):

$$0.5 \leq di/dt \leq 10 \quad (13)$$

where di/dt: Increasing rate of an output current density of the fuel cell (A/cm$^2$/sec).

According to the present invention, specifications of a fuel cell that satisfy in good balance the three elements, namely, driving performance (accelerating performance or the like), fuel economy of a fuel cell, and inhibition of deterioration of durability of the fuel cell in the electric automobile can be determined, although the details will be discussed hereinafter.

The characteristic value K is calculated according to an expression (14) given below, and the predetermined range in the third step is defined by an expression (15) given below:

$$K = 1/(Rcap \cdot Rfc^{1/2}) \quad (14)$$

where Rfc: Internal resistance of the fuel cell; and Rcap: Internal resistance of the capacitor; and $$0.7 \leq K \leq 6 \quad (15)$$

where the unit of Rfc and Rcap in the above expression (14) is Ω.

According to the present invention, specifications of a fuel cell and a capacitor that satisfy in good balance three elements, namely, driving performance (accelerating performance or the like), fuel economy of a fuel cell, and inhibition of deterioration of durability of the fuel cell in the electric automobile can be determined. This will be discussed in detail hereinafter.

The fuel cell power generation system in accordance with the present invention is a fuel cell power generation system constructed of a fuel cell and a capacitor connected in parallel and mounted in an electric automobile. The limit value of the increasing rate di/dt of an output current density per unit cell area of the fuel cell is set to be within a range defined by the following expression (16):

$$0.5 \leq di/dt \leq 10 \quad (16)$$

where di/dt: Increasing rate of output current density per unit cell area of the fuel cell (A/cm$^2$/sec).

The internal resistance Rfc of the fuel cell is set on the basis of an output current-voltage (I-V) characteristic of the fuel cell based on the limit value of the increasing rate di/dt of an output current density per unit cell area of the fuel cell, and an internal resistance Rcap of the capacitor is set such that a characteristic value K calculated by weighted multiplication of the internal resistance Rfc of the fuel cell and an internal resistance Rcap of the capacitor according to an expression (17) given below lies within a range defined by an expression (18) given below:

$$K = 1/(Rcap \cdot Rfc^{1/2}) \quad (17)$$

where Rfc: Internal resistance of the fuel cell; and Rcap: Internal resistance of the capacitor;

$$0.7 \leq K \leq 6 \quad (18)$$

where the unit of Rfc and Rcap in the above expression (17) is Ω.

The present invention makes it possible to successfully construct a fuel cell power generation system to be mounted in an electric automobile by satisfying, in good balance, the three requirements, namely, the driving performance (accelerating performance or the like), fuel economy of the fuel cell, and inhibition of deterioration of durability of the fuel cell in the electric automobile.

BRIEF DESCRIPTION OF THE DRAWINGS

FIG. 6 is an explanatory diagram illustrating a benchmark of durability;

FIGS. 9A, 9B, 9C, and 9D are explanatory diagrams illustrating setting ranges of a characteristic value K;

DESCRIPTION OF THE PREFERRED EMBODIMENTS

Figure 1:
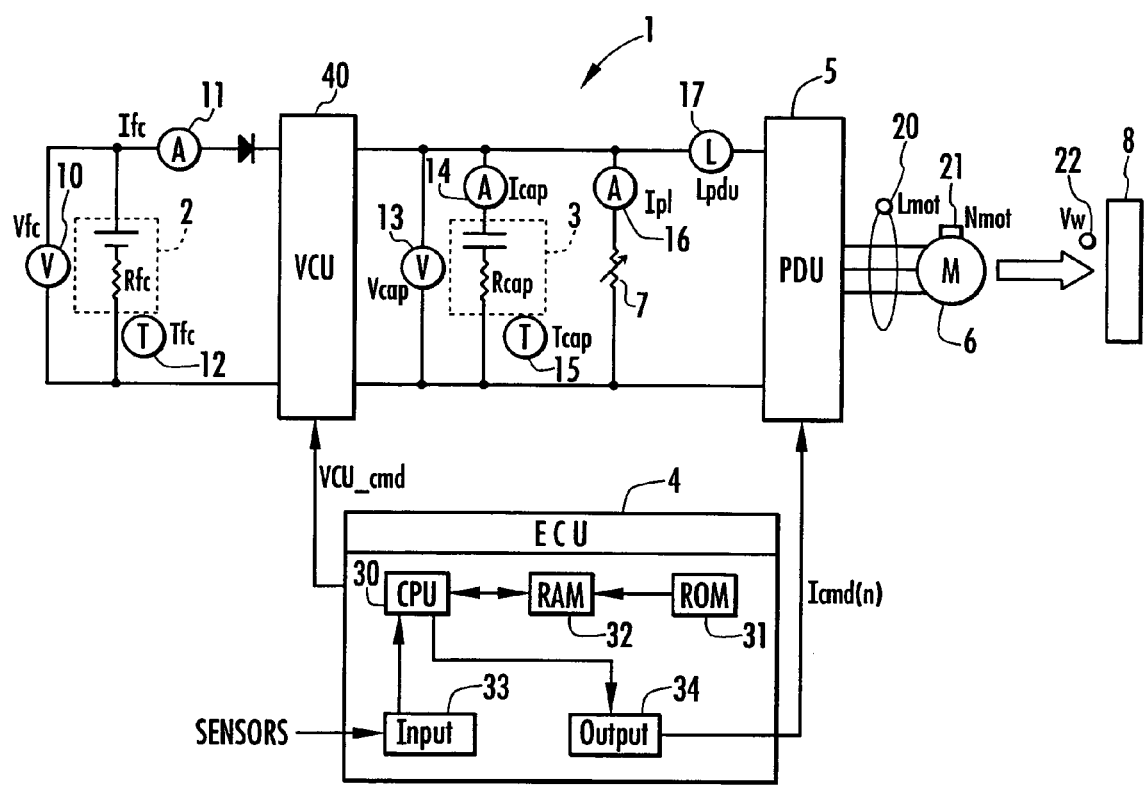
FIG. 1 is a configuration diagram of a fuel cell power generation system.
Figure 2:
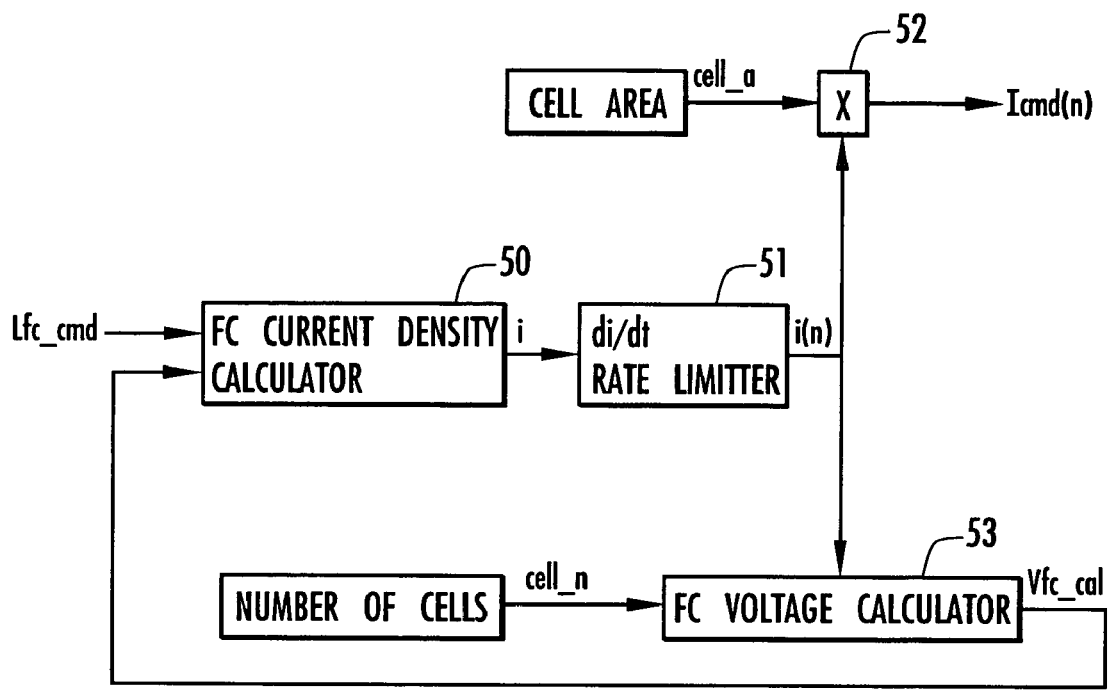
FIG. 2 is a control block diagram of a controller shown in FIG. 1.
Figure 3:
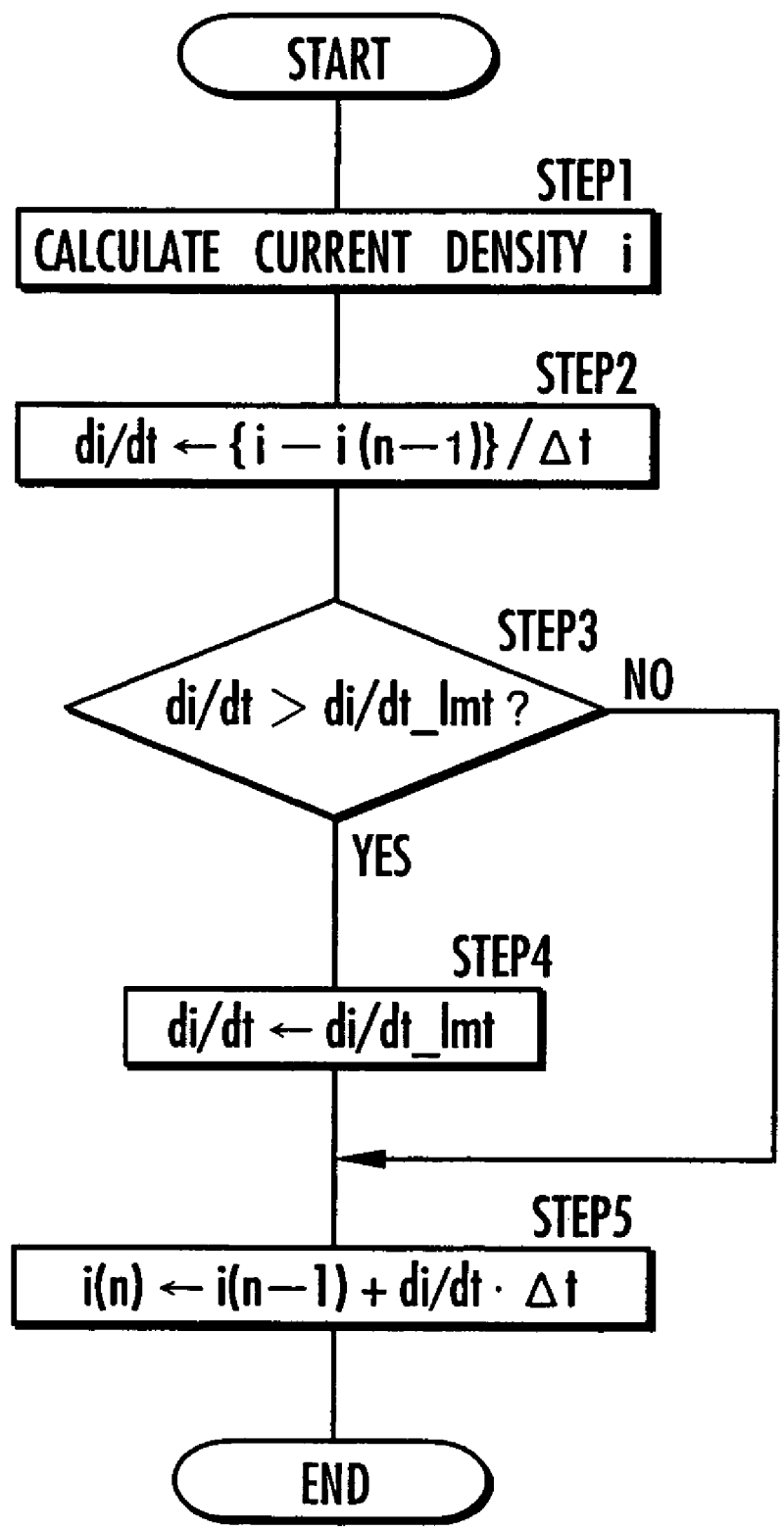
FIG. 3 is an operational flowchart of the controller shown in FIG. 1.
Figure 4:
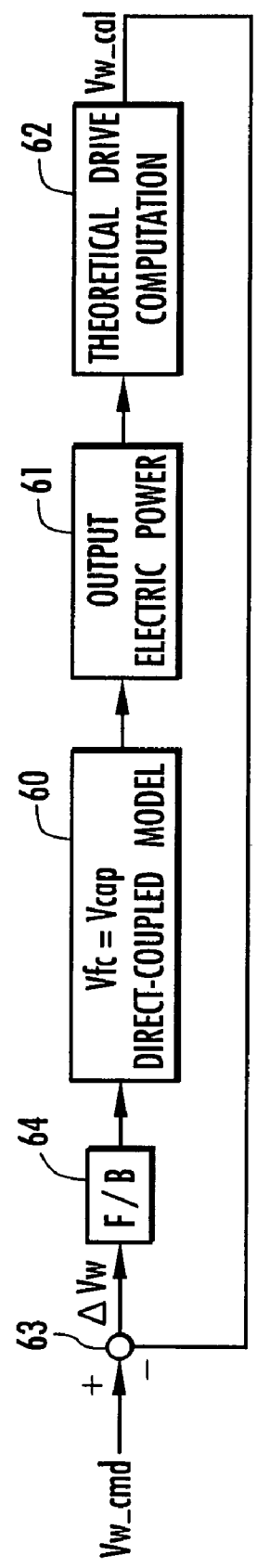
FIG. 4 is a control block diagram illustrating a computer simulation of the fuel cell power generation system.
Figure 5A:
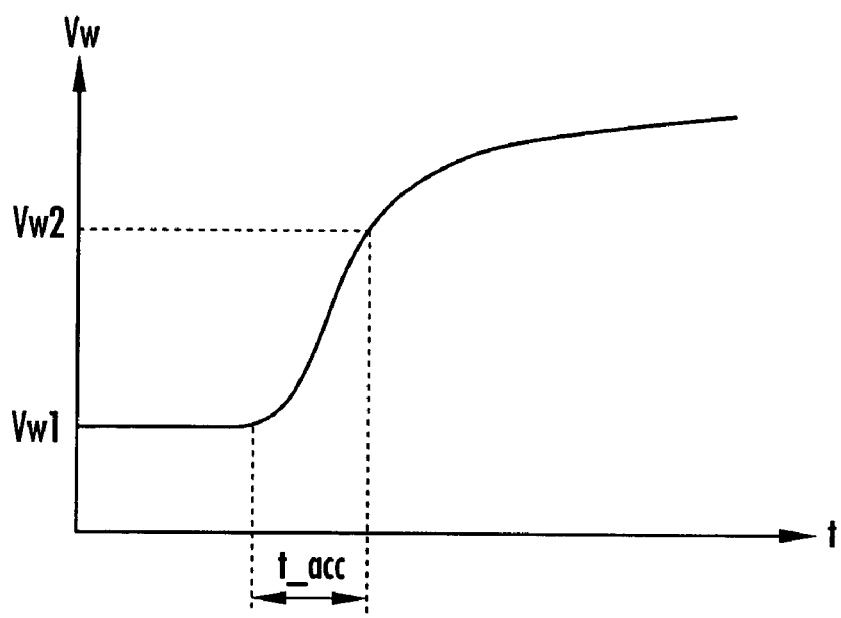
FIG. 5A and FIG. 5B are explanatory diagrams illustrating benchmarks of driving performance.
Figure 5B:
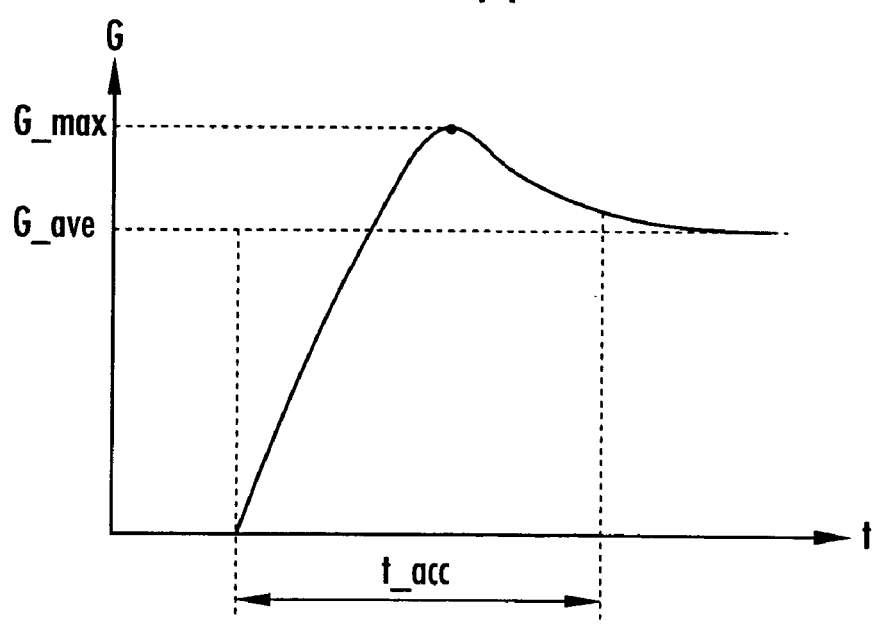
Figure 10:
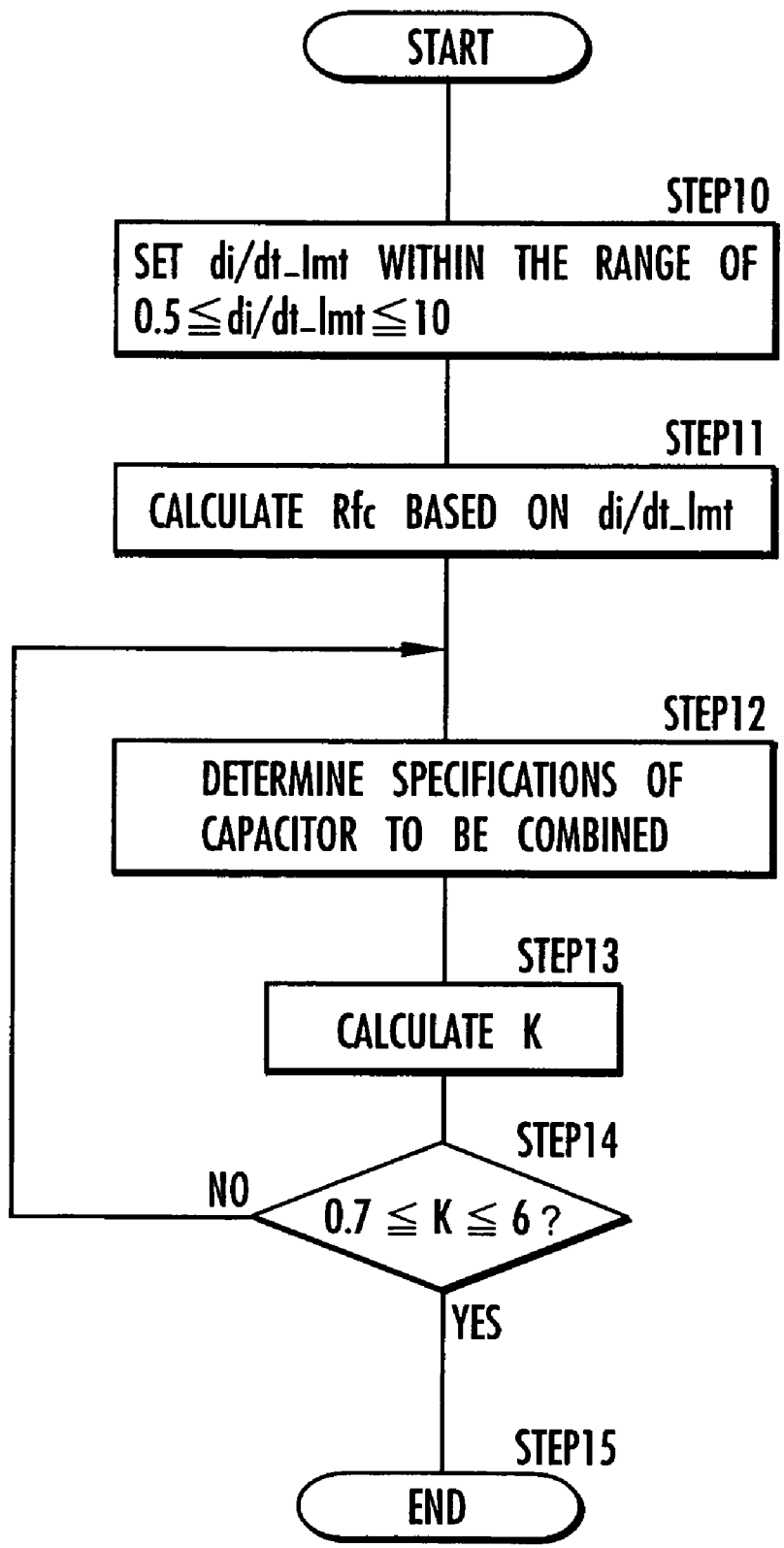
FIG. 10 is a flowchart showing a procedure for determining specifications of a fuel cell and a capacitor.
Figure 11A:
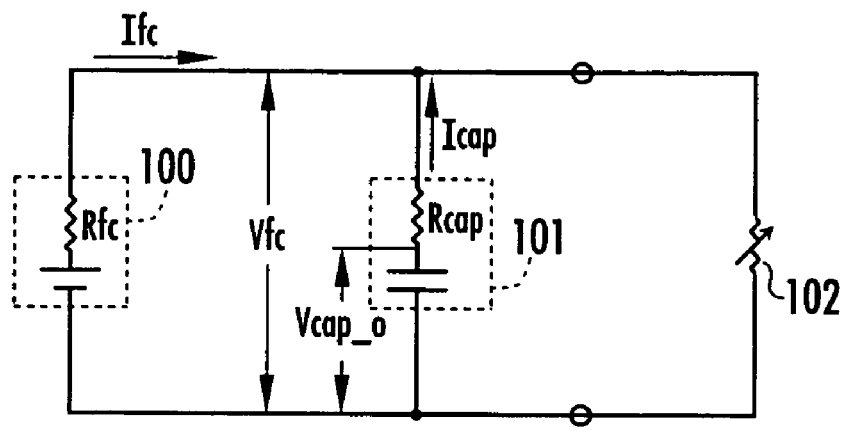
FIG. 11A is a circuit diagram for explaining a definition of the characteristic value K.
Figure 11B:
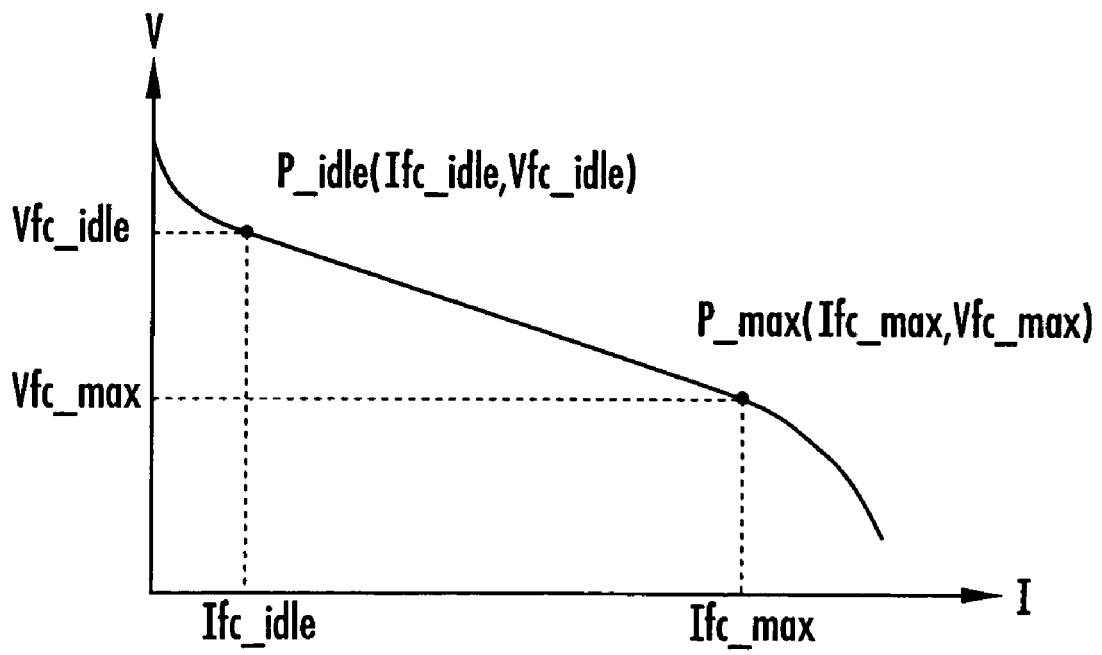
FIG. 11B is an I-V characteristic graph of the fuel cell.

An embodiment in accordance with the present invention will be explained with reference to FIG. 1 through FIG. 10. FIG. 1 is a configuration diagram of a fuel cell power generation system; FIG. 2 is a control block diagram of a controller shown in FIG. 1; FIG. 3 is an operational flowchart of the controller shown in FIG. 1; FIG. 4 is a block diagram illustrating a computer simulation of the fuel cell power generation system; FIG. 5A and FIG. 5B are explanatory diagrams illustrating benchmarks of driving performance; FIG. 6 is an explanatory diagram illustrating a benchmark of durability; FIGS. 7A, 7B, 7C, and 7D are explanatory diagrams showing setting ranges of a limit value of an output current increasing rate di/dt_lmt; FIG. 8A and FIG. 8B are explanatory diagrams showing changes in an internal resistance Rfc of the fuel cell based on di/dt_lmt; FIGS. 9A, 9B, 9C, and 9D are explanatory diagrams illustrating setting ranges of a characteristic value K; and FIG. 10 is a flowchart showing a procedure for determining specifications of a fuel cell and a capacitor.

Referring to FIG. 1, a fuel cell power generation system 1 in accordance with the present invention for which specifications are to be determined by the method in accordance with the present invention is mounted in an electric automobile to serve as a power source for driving the electric automobile. The fuel cell power generation system 1 is a hybrid power generation system constructed of a fuel cell 2 that outputs current by causing electrochemical reactions with hydrogen and air as reaction gases, and an electric double layer capacitor 3, which corresponds to the capacitor in the present invention (hereinafter referred to simply as the capacitor 3), the fuel cell 2 and the capacitor 3 being connected in parallel. Output power of the fuel cell power generation system 1 is controlled by a controller 4 composed of a microcomputer, a memory, etc.

Output power of the fuel cell power generation system 1 is supplied through the intermediary of a motor drive unit 5 to a motor 6, which corresponds to an electric load in the present invention, and an electric auxiliary unit 6, such as a compressor or an air conditioner for supplying air to the fuel cell 2, which corresponds to the electric load in the present invention. The motor drive unit 5 controls output current such that a desired current value Icmd(n) output from the controller 4 is supplied to the motor 6, (n) indicating that the desired current value is the one in an n-th control cycle by the controller 4. Then, the driving force of the motor 6 is transmitted to a driving wheel 8.

The fuel cell power generation system 1 includes a fuel cell voltage sensor 10 for detecting an output voltage Vfc of the fuel cell 2, a fuel cell current sensor 11 for detecting an output current Ifc of the fuel cell 2, a fuel cell temperature sensor 12 for detecting a temperature Tfc of the fuel cell 2, a capacitor voltage sensor 13 for detecting a terminal-to-terminal voltage Vcap of the capacitor 3, a capacitor current sensor 14 for detecting a charge/discharge current Icap of the capacitor 3, a capacitor temperature sensor 15 for detecting a temperature Tcap of the capacitor 3, an auxiliary unit current sensor 16 for detecting a current Ipl supplied to an electric auxiliary unit 7, a PDU power sensor 17 for detecting power Lpdu supplied to the motor drive unit 5, a motor power sensor 20 for detecting power Lmot supplied to the motor 6, an RPM sensor 21 for detecting the number of revolutions Nmot of the motor 6, and a vehicular speed sensor 22 for detecting a vehicular speed Vw.

Detection signals of these sensors are supplied to the controller 4. The controller 4 grasps an operational state of the fuel cell power generation system 1 from the detection signals received from the sensors, thereby controlling the operations of the fuel cell 2 and the motor drive unit 5.

The controller 4 includes a CPU 30, a ROM 31 storing map data for selecting a limit value of an increasing rate di/dt of an output current density per unit cell area of the fuel cell 2 on the basis of the detected temperature Tfc or the like of the fuel cell 2, a RAM 32 in which a limit value of di/dt selected on the basis of the map data is written, an input interface circuit 33 for capturing detection signals output from the sensors into the CPU 30, and an output interface circuit 34 for converting diverse types of control signals output from the CPU 30 according to the specifications of a system to be controlled.

The CPU 30 decides a desired current value Icmd(n) for the motor drive unit 5 such that it does not exceed a di/dt limit value written to the RAM 32, and outputs the decided Icmd(n). A DC/DC converter 40 for restricting the output current Ifc of the fuel cell 2 is provided between the fuel cell 2 and the capacitor 3. In the present embodiment, the DC/DC converter 40 is subjected to through (Vfc=Vcap) control so as to directly connect the fuel cell 2 and the capacitor 3.

FIG. 2 is a block diagram that illustrates processing for setting the desired current value Icmd(n) by the controller 4. When desired output power Lfc_cmd of the fuel cell 2 is given, a current density calculator 50 calculates a current density i (A/m$^2$) per unit area of the fuel cell. Then, a di/dt limiter 51 calculates a desired value i(n) of a current density in the present control cycle such that an increasing rate di/dt of the current density i does not exceed a limit value written to the RAM 32 (refer to FIG. 1).

A multiplier 52 multiplies the desired value i(n) of current density and a cell area cell_a of the fuel cell 2 to calculate the desired current Icmd(n). A fuel cell voltage calculator 53 calculates an output voltage Vfc_cal of the fuel cell 2 when a desired value i(n) is output on the basis of the desired value i(n) of current density and the number of cells of the fuel cell 2.

To be more specific, the current density calculator 50 and the di/dt limiter 51 calculate the desired value i(n) of an output current density according to the flowchart shown in FIG. 3. Specifically, in STEP 1, the current density calculator 50 divides the desired power Lfc_cmd of the fuel cell 2 by the output voltage Vfc_cal of the fuel cell 2 and the cell area of the fuel cell to calculate a current density i associated with the desired power Lfc_cmd.

The di/dt limiter 51 calculates the increasing rate di/dt of the current density in the present control cycle according to the following expression (19) in STEP 2:

$$di/dt = [i - i(n-1)]/\Delta t \qquad (19)$$

where i(n−1): Desired current density in a previous control cycle; and Δt: Control cycle.

In the subsequent STEP 3, the di/dt limiter 51 determines whether the calculated di/dt exceeds the limit value di/dt_lmt of di/dt written to the RAM 32 (refer to FIG. 1). If the di/dt exceeds the limit value di/dt_lmt, then the program proceeds to STEP 4 wherein the di/dt limiter 51 changes di/dt to the limit value di/dt_lmt. If it is determined in STEP 3 that di/dt is the limit value di/dt_lmt or less, then the program proceeds to STEP 5 without changing the di/dt.

The processing carried out in STEP 3 and STEP 4 sets the di/dt to the limit value di/dt_lmt or less. In the subsequent STEP 5, the di/dt limiter 51 calculates a desired current density i(n) in the present control cycle according to an expression given below (20):

$$i(n) = i(n-1) + di/dt \cdot \Delta t \qquad (20).$$

The specifications of the fuel cell power generation system 1 must be determined to meet various requirements, including driving performance required of an electric automobile in which the fuel cell power generation system 1 is installed, fuel economy of the fuel cell 2, and inhibition of deterioration of durability of the fuel cell 2.

To easily determine the specifications of the fuel cell power generation system 1 that satisfy the aforesaid requirements, the present embodiment uses a computer to perform arithmetic processing by using two parameters, namely, the limit value di/dt_lmt of the output current density di/dt of the fuel cell 2 and the characteristic value K calculated according to the above expression (14). Thus, the specifications of the fuel cell 2 and the capacitor 3 are determined.

The present inventors carried out a computer simulation using an electric automobile model shown in FIG. 4 in order to study influences on the driving performance of the electric automobile, the fuel economy of the fuel cell, and the durability of the fuel cell exerted by changes of the limit value di/dt_lmt of the output current density di/dt of the fuel cell 2 and the characteristic value K.

In the model shown in FIG. 4, the fuel cell power generation system 1 shown in FIG. 1 is represented by a direct-coupled model 60 of the fuel cell and the capacitor. A desired vehicular speed Vw_cmd of the electric automobile and a theoretical vehicular speed Vw_cal calculated by theoretical drive calculation based on output power 61 from the direct-coupled model 60 of the fuel cell and the capacitor are subjected to subtraction by a subtracter 63 to calculate a difference ΔVw therebetween. Then, a feedback controller 64 controls the operation of the direct-coupled model 60 of the fuel cell and the capacitor so as to cancel the difference ΔVw.

The limit value di/dt_lmt of the output current density and the characteristic value K are changed to obtain three benchmarks, namely, the driving performance, the fuel economy, and durability, as the benchmarks for evaluating the performance of the model shown in FIG. 4. More specifically, the benchmark of the driving performance uses time t_acc required for the vehicular speed Vw of the electric automobile to be accelerated from predetermined Vw1 to predetermined Vw2, as shown in the graph of FIG. 5A in which the axis of ordinates indicates the vehicular speed Vw and the axis of abscissas indicates time t.

As shown in the graph of FIG. 5B in which the axis of ordinates indicates vehicular acceleration G and the axis of abscissas indicates time t, a peak value G_max of the acceleration G at the time t_acc required for the vehicular speed to be accelerated from Vw1 to Vw2 or an average value G_ave of the acceleration G at the required time t_acc may be used as the benchmark of the driving performance.

For the benchmark of the fuel economy, the fuel economy of the fuel cell in a typical emission measurement mode, e.g., LA4, 10–15 mode or the like, is calculated according to the following expressions (21) and (22):

$$\text{Fuel efficiency} = \text{Mileage}/\text{Amount of consumed } H_2 \quad (21)$$

$$\text{Amount of consumed } H_2 = \int Ifc \, dt/2/F \cdot \text{Cell} \cdot M \quad (22)$$

where F: Faraday constant (=96485 c/mol); Cell: Number of cells of the fuel cell; and M: Molecular weight (=2.016e$^{-3}$ kg/mol).

The benchmark of the durability uses ΔVave2 denoting a square average error of an output voltage Vfc of the fuel cell in the emission measurement mode and a release voltage Vfc_0 of the fuel cell when shipped out, these values being calculated according to expressions (23) and (24) given below. It is assumed that ΔVave2 and a logarithm of the durability time of the fuel cell have a linear relationship:

$$\Delta Vfc = \text{Max}(Vfc\_0 - Vfc, 0) \quad (23)$$

$$\Delta Vave2 = sqrt(\int \Delta Vfc^2 dt/t) \quad (24)$$

FIG. 6 is a graph in which the axis of ordinates indicates the logarithm logt of time t and the axis of abscissas indicates ΔVave2. If, for example, ΔVave2=ΔVave2_1, then the durability time of the fuel cell will be $t_1$.

FIG. 7 shows the benchmarks of the driving performance, the fuel economy, and the durability calculated by carrying out a computer simulation using the model shown in FIG. 4, the limit values di/dt_lmt of the increasing rate di/dt of the output current density of the fuel cell being set at different values. FIG. 7A through FIG. 7D are graphs in which the axes of abscissas indicate logarithms of the limit values di/dt_lmt of the increasing rate di/dt of the output current density of the fuel cell. The axis of ordinates of the graph in FIG. 7A indicates benchmarks of the driving performance, the axis of ordinates of the graph in FIG. 7B indicates benchmarks of the fuel economy, and the axis of ordinates of the graph in FIG. 7C indicates benchmarks of the durability. The axis of ordinates in FIG. 7D indicates the values obtained by normalizing and multiplying the benchmarks of the driving performance, the fuel economy, and the durability in FIG. 7A through FIG. 7C.

Figure 7A:
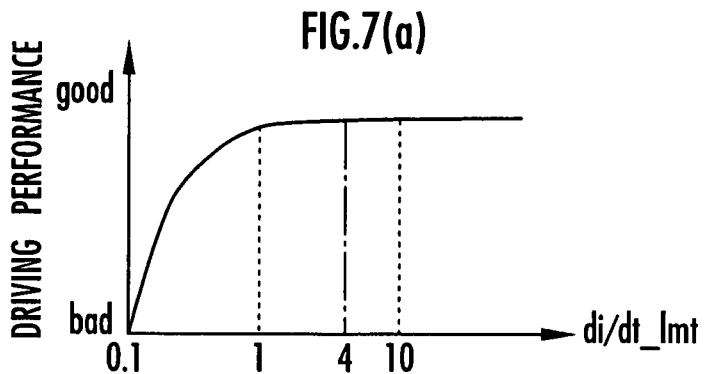
FIGS. 7A, 7B, 7C, and 7D are explanatory diagrams showing setting ranges of a limit value of an output current increasing rate di/dt_lmt of the fuel cell.
Figure 8A:
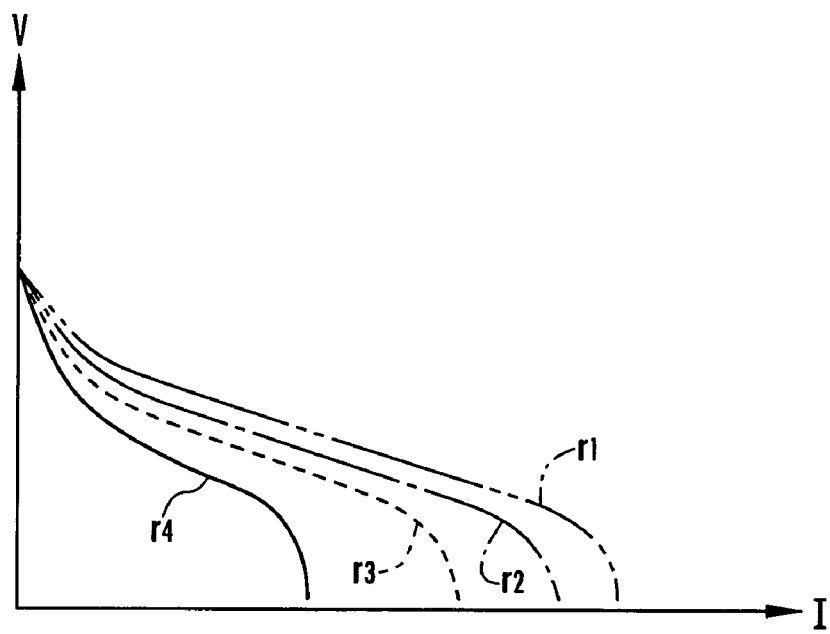
FIG. 8A and FIG. 8B are explanatory diagrams showing changes in an internal resistance Rfc of the fuel cell based on di/dt_lmt.
Figure 8B:
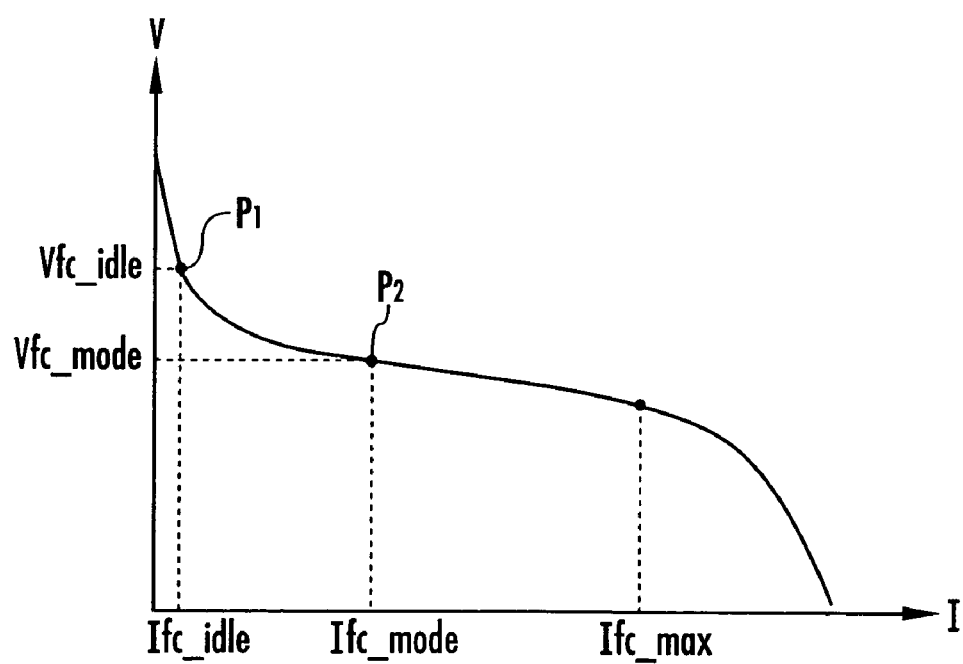

Referring to the graph in FIG. 7A, if the di/dt_lmt is decreased until it is smaller than 0.2 A/cm$^2$/sec, the benchmark value of the driving performance suddenly decreases, showing deterioration of the driving performance. If di/dt_lmt is increased until it exceeds 2 A/cm$^2$/sec, then a change in the benchmark of the driving performance becomes extremely small, and no change is observed in the benchmark of the driving performance when di/dt_lmt exceeds 4 A/cm$^2$/sec.

Figure 7B:
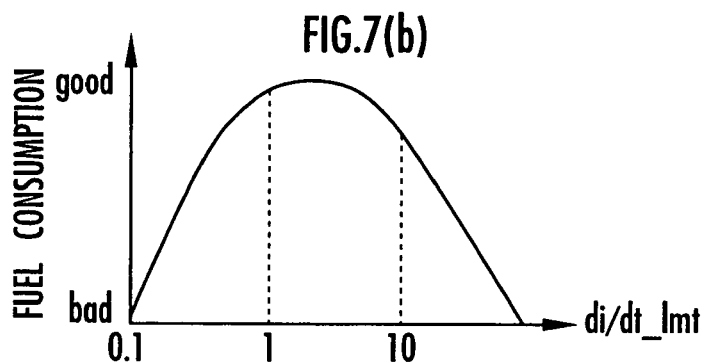
Figure 7C:
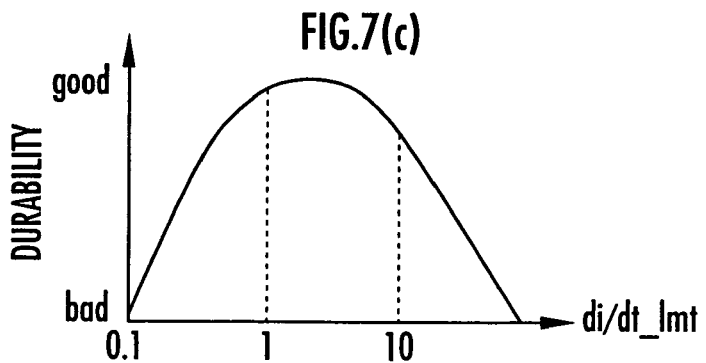
Figure 7D:
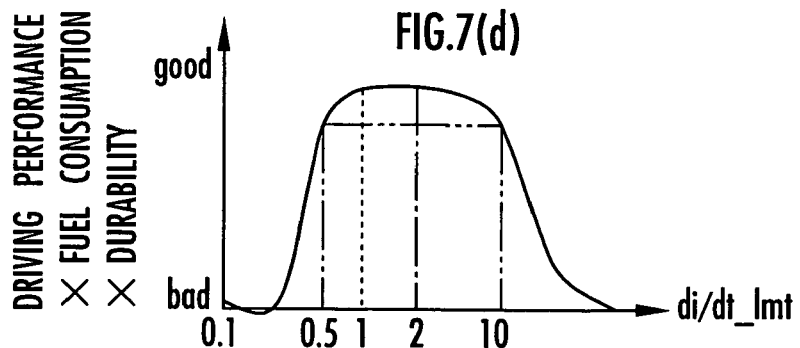

From the graphs in FIG. 7B and FIG. 7C, it is understood that the fuel economy and the durability of the fuel cell deteriorate if di/dt_lmt is excessively large or small. Furthermore, from the graph of FIG. 7D that shows the results obtained by normalizing and multiplying the benchmarks of the driving performance, the fuel economy, and the durability indicated on the axes of ordinates of the graphs of FIG. 7A through FIG. 7C, it is understood that the specifications of the fuel cell can be determined with successfully balanced levels of the driving performance, the fuel economy, and the durability by setting di/dt_lmt within the range defined by 0.5≦di/dt_lmt≦10. It is particularly desirable to set di/dt_lmt within the range defined by 1≦di/dt_lmt≦2.

FIG. 8A shows changes in the I-V characteristic of the fuel cell observed when the setting of the limit value di/dt_lmt of the output current density of the fuel cell is changed. The axis of ordinates indicates voltage (V), while the axis of abscissas indicates current (I). As di/dt_lmt is increased, the I-V characteristic of the fuel cell exhibits changes represented by $r_1 \rightarrow r_2 \rightarrow r_3 \rightarrow r_4$ in the graph, and the output voltage Vfc decreases as the output current Ifc of the fuel cell increases. If an operational frequency at low voltages is high, then deterioration of the durability of the fuel cell tends to be accelerated.

Therefore, after determining di/dt_lmt, the internal resistance Rfc of the fuel cell is determined as shown in FIG. 8B from the I-V characteristic of the fuel cell on the basis of di/dt_lmt. Referring to FIG. 8B, the axis of ordinates indicates voltage (V) and the axis of abscissas indicates current (I) to show the I-V characteristic of the fuel cell. In FIG. 8B, $P_1$ denotes an idle mode of the electric automobile, while $P_2$ denotes a state wherein the output current of the fuel cell reaches a maximum level when the emission measurement mode is implemented. The internal resistance Rfc of the fuel cell can be calculated according to an expression (25) given below:

$$Rfc = (Vfc\_\text{mode} - Vfc\_\text{idle})/(Ifc\_\text{mode} - Ifc\_\text{idle}) \quad (25)$$

Then, using the value of Rfc calculated according to the above expression (25), the characteristic value K is calculated according to the above expression (12). FIG. 9 shows benchmarks of the driving performance, the fuel economy, and the durability calculated by carrying out a computer simulation using the model shown in FIG. 4 and by changing the characteristic value K. FIG. 9A through FIG. 9D are graphs in which the axes of abscissas indicate logarithms of the characteristic value K. The axis of ordinates of the graph in FIG. 9A indicates benchmarks of the driving performance, the axis of ordinates of the graph in FIG. 9B indicates benchmarks of the fuel economy, and the axis of ordinates of the graph in FIG. 9C indicates benchmarks of the durability. The axis of ordinates in FIG. 9D indicates the values obtained by normalizing and multiplying the benchmarks of the driving performance, the fuel economy, and the durability in FIG. 9A through FIG. 9C.

From the graph in FIG. 9A, it is understood that if the characteristic value K is decreased to 0.5 or less, then the driving performance deteriorates. Furthermore, from the graph in FIG. 9B, it is understood that if the internal resistance Rcap of the capacitor and the internal resistance Rfc of the fuel cell increase and the characteristic value K decreases to 0.2 or less, then the fuel economy rapidly deteriorates due to an increase in the internal loss of the capacitor and a reduction in the power generation efficiency of the fuel cell. If the value of Rfc reduces and the characteristic value K reaches 6 or more, then a change in the output voltage Vfc of the fuel cell during a travel in the emission measurement mode decreases, so that the assist by discharge current of the capacitor reduces, resulting in deteriorated fuel economy.

Referring to the graph in FIG. 9C, the durability deteriorates if the characteristic value K is less than 0.5, as in the case of the driving performance. This is because, if the internal resistance Rfc of the fuel cell is large, then the lowering width of the output voltage Vfc increases when the output current Ifc of the fuel cell increases, leading to deteriorated durability of the fuel cell.

From the graph of FIG. 9D that shows the results obtained by normalizing and multiplying the benchmarks of the driving performance, the fuel economy, and the durability indicated on the axes of ordinates of the graphs of FIG. 9A through FIG. 9C, it is possible to determine the specifications of the fuel cell and the capacitor with successfully balanced levels of the driving performance, the fuel economy, and the durability by setting the characteristic value K within the range defined by $0.7 \leq K \leq 6$.

Referring now to FIG. 10, the procedure for determining the specifications of the fuel cell and the capacitor by performing arithmetic processing by a computer will be explained. First, in STEP 10, the limit value di/dt_lmt of the increasing rate of the output current density of the fuel cell is set within a range defined by $0.5 \leq di/dt\_lmt \leq 10$ according to the operational mode of an electric load in an electric automobile in which the fuel cell power generation system is installed.

The internal resistance Rfc of the fuel cell based on di/dt_lmt is calculated in the following STEP 11, and then the specifications of the capacitor to be combined therewith are determined in the subsequent STEP 12. In the next STEP 13, the characteristic value K is calculated from the internal resistance Rfc of the fuel cell and the internal resistance Rcap of the capacitor, and it is determined in STEP 14 whether the calculated characteristic value K lies within the range defined by $0.7 \leq K \leq 6$.

If it is determined in STEP 14 that the characteristic value K lies within $0.7 \leq K \leq 6$, then it is determined that the specifications of the capacitor have been set with good balance among the driving performance, the fuel economy, and the durability. Hence, the program proceeds to STEP 15 to terminate the processing.

On the other hand, if it is determined in STEP 14 that the characteristic value K is out of the range defined by $0.7 \leq K \leq 6$, then the program returns to STEP 12 wherein the specifications of the capacitor to be combined therewith are determined again, and then the processing of STEP 13 and STEP 14 is carried out again.

Thus, the specifications of the fuel cell power generation system are determined eventually to satisfy both conditions, namely, $0.5 \leq di/dt\_lmt \leq 10$ and $0.7 \leq K \leq 6$. In this case, using the two parameters, namely, the upper limit value di/dt_lmt of the increasing rate of the output current density of the fuel cell and the characteristic value K, makes it possible to easily determine the specifications of the fuel cell power generation system that meets the three requirements, the driving performance, the fuel economy, and the durability, in good balance.

STEP 10 corresponds to the first step in the present invention, STEP 11 corresponds to the second step in the present invention, and STEP 12 through STEP 14 correspond to the third step in the present invention.

In the present embodiment, the characteristic value K has been calculated according to the above expression (12). Alternatively, however, the setting of the weighting of the internal resistance Rfc of the fuel cell and the internal resistance Rcap of the capacitor may be changed, and different weighted multiplication may be carried out to calculate the characteristic value K.

In the present embodiment, the description has been given of the method for determining the specifications of the fuel cell and the capacitor for the fuel cell power generation system mounted in an electric automobile. The present invention, however, can be extensively applied for determining the specifications of fuel power generation systems constructed of fuel cells and capacitors connected in parallel to supply power to electric loads.

What is claimed is:

1. A method for determining, by a programmed computer, specifications of a fuel cell power generation system constructed of a fuel cell and a capacitor connected in parallel, thereby enabling a person to determine the specifications of the fuel cell power generation system comprising:

a first step for determining by the computer a limit value of an increasing rate di/dt of an output current density per unit cell area of the fuel cell according to at least an operational mode of an electric load connected to the fuel cell system;

a second step for determining by the computer an internal resistance Rfc of the fuel cell on the basis of an output current-voltage (I-V) characteristic of the fuel cell based on the di/dt limit value Q determined by the first step; and a third step for determining by the computer an internal resistance Rcap of the capacitor such that a characteristic value K calculated by weighted multiplication of Rfc determined by the second step and Rcap lies within a predetermined range, thereby to determine specifications of the fuel cell and the capacitor based on the limit value, the internal resistance of the fuel cell, and the internal resistance of the capacitor.

2. The method for determining specifications of a fuel cell power generation system according to claim 1, wherein the characteristic value K is calculated according to an expression (26) given below:

$$K = 1/(Rcap \cdot Rfc^{1/2}) \qquad (26)$$

where Rfc: Internal resistance of fuel cell; and Rcap: Internal resistance of capacitor.

3. The method for determining specifications of a fuel cell power generation system according to claim 1 or 2, wherein the fuel cell power generation system is mounted in an electric automobile, and the electric load is an electric motor mounted in the electric automobile to actuate driving wheels and a di/dt limit value is determined in the first step such that it lies within a range defined according to an expression (27) given below:

$$0.5 \leq di/dt \leq 10 \qquad (27)$$

where di/dt: Increasing rate (A/cm²/sec) of output current density per unit cell area of fuel cell.

4. The method for determining specifications of a fuel cell power generation system according to claim 3, wherein the predetermined coefficient K is calculated according to an expression (28) given below, and the predetermined range in the third step is defined by an expression (29) giving below:

$$K = 1/(Rcap \cdot Rfc^{1/2}) \qquad (28)$$

where Rfc: Internal resistance of fuel cell; and Reap: Internal resistance of capacitor, $$0.7 \leq K \leq 6 \qquad (29)$$

where the unit of Rfc and Rcap in the above expression (28) is Ω.

5. A fuel cell power generation system comprising:
a fuel cell,
a capacitor connected in parallel and mounted in an electric automobile, and
a processor,
wherein an increasing rate di/dt limit value of an output current density per unit cell area of the fuel cell is set by the processor within a range defined according to an expression (30) given below:

$$0.5 <= di/dt <= 10 \qquad (30)$$

where di/dt: increasing rate (A/cm²/sec) of output current density per unit cell area of fuel cell, an internal resistance Rfc of the fuel cell is set by the processor on the basis of an output current-voltage (I-V) characteristic of the fuel cell based on the limit value of the increasing rate di/dt of an output current density per unit cell area of the fuel cell, and an internal resistance Rcap of the capacitor is set by the processor such that a characteristic value K calculated by weighted multiplication of the internal resistance Rfc of the fuel cell and an internal resistance Rcap of the capacitor according to an expression (31) given below lies within a range defined by an expression (32) given below:

$$K = 1/(Rcap \cdot Rfc^{1/2}) \qquad (31)$$

where Rfc: internal resistance of fuel cell; and Rcap: internal resistance of capacitor, $$0.7 <= K <= 6 \qquad (32)$$

where the unit of Rfc and Rcap in the above expression (31) is Ω.

* * * * *